(12) United States Patent
Chang-Mateu et al.

(10) Patent No.: US 6,353,087 B1
(45) Date of Patent: Mar. 5, 2002

(54) PROCESS FOR STRIPPING POLYMER DISPERSIONS

(75) Inventors: I-Hwa Midey Chang-Mateu, Ambler; James Michael Lipovsky, Langhorne; Dawn Marie McFadden, Yardley; Richard Shu-Hua Wu, Fort Washington, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/641,166

(22) Filed: Aug. 17, 2000

Related U.S. Application Data

(60) Provisional application No. 60/151,096, filed on Aug. 27, 1999.

(51) Int. Cl.$^7$ .................................................. C08J 3/00
(52) U.S. Cl. ...................................... 528/481; 528/500
(58) Field of Search .......................................... 528/481

(56) References Cited

U.S. PATENT DOCUMENTS

| | | | | |
|---|---|---|---|---|
| 4,016,128 A | * | 4/1977 | Serlin | 260/29.6 |
| 4,130,527 A | | 12/1978 | Miller et al. | 260/29.6 |
| 4,132,699 A | * | 1/1979 | Bannister | 260/38 |
| 4,193,903 A | * | 3/1980 | Giddings | 260/29.6 |
| 4,197,399 A | * | 4/1980 | Noel | 528/500 |
| 4,197,400 A | * | 4/1980 | Wollrab | 528/500 |
| 4,245,073 A | * | 1/1981 | Noel | 526/230.5 |
| 4,252,705 A | * | 2/1981 | Breecker | 260/29.6 |
| 4,292,424 A | * | 9/1981 | Huddleston | 528/500 |
| 5,194,583 A | * | 3/1993 | Krulik | 528/485 |
| 5,393,856 A | * | 2/1995 | Kulzick | 526/332 |
| 5,516,818 A | * | 5/1996 | Chen | 523/332 |
| 5,756,659 A | * | 5/1998 | Hughes | 528/501 |
| 6,174,991 B1 | * | 1/2001 | Steiger | 528/486 |

FOREIGN PATENT DOCUMENTS

| | | |
|---|---|---|
| DE | DE 1 248 943 | 8/1967 |
| DE | DE 31 23 300 A1 | 1/1983 |
| DE | DE 195 17 680 A1 | 5/1995 |
| EP | EP 0 865 811 A1 | 3/1998 |

OTHER PUBLICATIONS

American Laboratory, Mar. 1989, "A mechanical Foam Separator For Industrial Chemical Processing" by R. B. Roy.

* cited by examiner

*Primary Examiner*—Paul R. Michl

(57) ABSTRACT

This invention relates to a process for stripping polymer reaction compositions. The process reduces gel in the polymer reaction composition by adjusting the pH of the polymer to from 7 to 11 prior to stripping and maintaining the adjusted pH during stripping, maintaining the temperature of the polymer at from 30° C. to 70° C. during stripping, utilizing a continuous stripping operation, or combinations thereof.

16 Claims, No Drawings

PROCESS FOR STRIPPING POLYMER DISPERSIONS

This appln claims benefit of provisional application No. 60/151,096 filed Aug. 27, 1999.

This invention relates to a process for removing volatile organic compounds ("VOCs") and amines such as ammonia from reaction compositions of polymer dispersions ("stripping"). In particular, the invention relates to a process for stripping polymer dispersions which reduces gel in the polymer dispersion.

Polymers may be made by various processes, including solution, suspension, and emulsion polymerization. As used herein, by dispersion is meant an emulsion or suspension polymer. Although the polymerization processes are efficient, there is always some VOCs after the polymerization is complete. As used herein, by VOC is meant any volatile organic compound, such as residual monomers, impurities from monomers, and solvents from surfactants or monomers. Residual monomer is monomer that does not react during a polymerization and remains in the polymer dispersion. VOCs tend to have strong odors. Generally, people can smell VOCs at extremely low levels, such as in the part per million range. Some VOCs are toxic. Due to the toxicity of some VOCs and the fact that the smell of VOCs tends to be irritating, polymer dispersions generally are either chemically "chased" or stripped of VOCs.

Chemical chasing involves adding chemicals that react with unreacted monomers, such as tertiary butyl hydroperoxide, ammonium persulfate, potassium persulfate, or sodium persulfate which, for example may react with carbon-carbon double bonds of the unreacted monomers. Although chasing results in reduced residual monomers in the polymer latex, the level of residual monomers may still be unacceptably high. Also, any VOCs which do not have carbon-carbon double bonds can not be chased. Therefore, chemical chasing is sometimes followed by stripping to remove unreacted VOCs.

Stripping is a process wherein a dispersion is heated and a gas is sparged through the dispersion to remove VOCs. Stripping may also utilize vacuum to enable the stripping to be performed at lower temperatures. The advantage to stripping polymer dispersions is that one can achieve lower levels of VOCs by stripping than by chasing.

One problem associated with stripping polymer dispersions is that gel may form during the stripping process. Gel is an aggregation of polymer particles or molecules, resulting in small clumps of polymer in the polymer solution or dispersion. Gel may cause problems in down stream applications, therefore there is a need for a polymer dispersion stripping process which reduces gel formation.

A second problem associated with stripping polymer dispersions is that the polymer dispersions frequently contain surfactants. Polymers may also behave as surfactants due to carboxy end groups. The surfactants or surfactant behavior of a polymer may cause foaming during stripping operations. Foaming may be controlled through the addition of chemicals such as silicone, mineral and vegetable oils, ethoxylated fatty acids, and alcohols. Two disadvantages of chemical addition to control foaming are that the chemicals may be expensive and the chemicals may adversely effect the polymer properties, for example, the chemicals may cause surface imperfections such as fish eyes or holes in coatings.

Mechanical foam breakers may also be utilized to reduce foam during polymer dispersion stripping operations, however the foam breaker does not reduce the formation of gel in the polymer dispersion. Therefore, there is also a need for a polymer dispersion stripping process which prevents foam formation or destroys foam generated during stripping.

One approach to controlling foam generation during a polymer dispersion stripping process was taught in German unexamined patent application DE 19517680. The process disclosed in that patent required pH adjustment to the range of from 5 to 6.8 during stripping to reduce foam generation. After stripping, the pH was adjusted to from 8 to 10. The process did not utilize a mechanical foam breaker and did not deal with the issue of gel formation during stripping.

A process for foam destruction in the manufacturing of polymers was disclosed in European Patent Application EP 865811. The process utilized mechanical foam breakers to destroy foam during the process of manufacturing a polymer. The process did not address the issue of gel formation during a polymer solution or dispersion stripping process.

U.S. Pat. No. 4,130,527 disclosed a stripping process which utilized a continuous stripping operation. Steam was fed counter-current to a falling film of polymer. The disclosure did not address the problems of foaming or gel formation during stripping polymer dispersions or solutions.

Despite the disclosure of the references, there is a continuing need for a process for stripping polymer dispersions wherein foam formation is prevented or foam formed during stripping is destroyed and gel formation is minimized.

The present invention provides a process including: providing a reaction composition and stripping the reaction composition in the presence of a mechanical foam breaker and an agitator; wherein the reaction composition is treated by a method selected from: a) adjusting the pH to from 7 to 11 prior to stripping and maintaining the adjusted pH during stripping, b) maintaining the temperature of the reaction composition at from 30° C. to 70° C. during stripping, and c) combinations thereof.

As indicated above, the first step in the process of the invention involves providing a reaction composition. The reaction composition may be polymers may be made by suspension or emulsion polymerization. Polymers made by emulsion polymerization are preferred. The polymers may be homopolymers or copolymers.

Among the monomers that may be useful to make the polymer dispersion are ethylenically unsaturated monomers which include, but are not limited to (meth)acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Butyl acrylate, methyl methacrylate, and styrene are preferred.

Ethylenically unsaturated acid containing monomers or salts thereof may also be useful. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

A fluorinated (meth)acrylate ethylenically unsaturated monomer, such as Zonyl™ products (Trademark of DuPont Chemical Company) may also be useful.

A silicone containing ethylenically unsaturated monomer, such as vinyl trimethoxy silane and methacryloxy propyl trimethoxy silane may also be useful.

Monomers selected from $C_6$–$C_{20}$ alkyl styrene and alkyl-alpha-methyl styrene, $C_6$–$C_{20}$ alkyl dialkyl itaconate, $C_{10}$–$C_{20}$ vinyl esters of carboxylic acids, $C_8$–$C_{20}$ N-alkyl acrylamide and methacrylamide, $C_{10}$–$C_{20}$ alkyl alpha-hydroxymethylacrylate, $C_8$–$C_{20}$ dialkyl 2,2'-(oxydimethylene) diacrylate, $C_8$–$C_{20}$ dialkyl 2,2'-(alkyliminodimethylene)diacrylate, $C_8$–$C_{20}$ N-alkylacrylimide, and $C_{10}$–$C_{20}$ alkyl vinylether may also be useful.

Hydrophobic monomers such as $C_{12}$ to $C_{40}$ alkyl ester of (meth)acrylic acid may also be useful. Suitable alkyl esters of (meth)acrylic acid include, but are not limited to lauryl (meth)acrylate, cetyl (meth)acrylate, stearyl (meth)acrylate, behenyl (meth)acrylate, and eicosyl (meth)acrylate.

Emulsion polymerizations are well known in the art and are described in U.S. Pat. No. 5,346,954, hereby incorporated by reference. Suitable initiators and process conditions can be found in the patent.

In one aspect of the present invention, polymers are stripped in the presence of a mechanical foambreaker. Mechanical foambreakers are described by M. Zlokarnik in *Chem. Ing. Tech.* 56 (1984), p. 839–844, hereby incorporated by reference for the types of foambreakers that may be useful in the process on the invention. Suitable foambreakers include, but are not limited to cyclones, Franz rotators, the EKATO Foamjet through the EKATO Company of Ramsey, N.J., and the FUNDAFOM® foam destroyer through Chemap AG of Volketswil, Switzerland.

The process of the invention yields a polymer dispersion with reduced gel. The formation of gel may be reduced by adjusting the pH of the reaction composition to from 7 to 11, preferably from 8 to 11, more preferably from 9 to 11 prior to stripping. The pH of the reaction composition is then maintained during stripping. The pH adjustment and maintenance may be achieved through the addition of base, such as, but not limited to sodium hydroxide, potassium hydroxide, or ammonium hydroxide. Where removal of amine odors is desired, potassium hydroxide or sodium hydroxide are preferred bases.

The formation of gel may also be reduced through reducing the temperature of the reaction composition during stripping. Stripping in a batch mode involves heating the solution or dispersion in a reactor and sparging a gas through the dispersion to remove VOCs. Vacuum may be applied to the reactor to allow stripping to occur at lower temperatures.

Stripping of the reaction composition may be performed at a temperature ranging from 30° C. to 70° C., preferably 40° C. to 70° C., more preferably 45 to 59° C. The vacuum may range from 20 mmHg to 150 mmHg, preferably from 40 mm Hg to 120 mm Hg, more preferably from 60 mm Hg to 100 mm Hg.

The gas utilized for stripping may be steam, nitrogen, helium, humid or wet air, wet nitrogen, or wet helium. As used herein, by humid or wet is meant that the gas contains water vapor.

It may be desirable to combine pH adjustment and temperature control during the stripping of a reaction composition. The temperature and pH ranges described above are useful when both temperature and pH control are utilized in a polymer solution or dispersion stripping operation.

We have also discovered that the amount of gas holdup in the polymer dispersion effects the rate at which the VOC's are removed. Agitation effects the gas holdup. The rate at which VOCs are removed from the polymer dispersion may be improved through the use of concave-blade disc impellers, a radial agitator, as described by Bakker et al. in *Chemical Engineering* (December 1994), p. 98–104.

Another method suitable for improving the rate at which VOCs are removed from the polymer dispersion is to change the direction of pumping of the agitators, such as, but not limited to pitched blade turbines so that the reaction composition is pumped up in the reactor.

For various reasons, a continuous stripping process may be desired. Therefore, in a second embodiment of the present invention, there is provided a process including: continuously feeding a reaction composition selected from an acrylic solution polymer and an acrylic dispersion polymer containing volatile organic compounds down a stripping column having a top and a bottom; ii) continuously feeding steam up from the bottom of the stripping column; and iii) removing the volatile organic compounds from the polymer.

In this second embodiment of the present invention, the reaction composition is an acrylic solution polymer or an acrylic dispersion polymer and the stripping is performed in a continuous mode. In the continuous mode, an acrylic solution or dispersion polymer is continuously fed to a stripping column. The polymer solution or dispersion falls down the column, creating a thin film of polymer along the column walls. Steam is simultaneously fed up the column. Volatile organic compounds are removed from the polymer in the column. The process may be operated under the same temperature and pressure conditions as the batch mode described above.

The column flux rate of acrylic solution or dispersion polymer into the column may range from 2,500 kg per hour per $m^2$ to 30,000 kg per hour per $m^2$, preferably from 7,500 kg per hour per $m^2$ to 25,000 kg per hour per $m^2$. The column flux rate of steam into the column may range from 500 kg per hour per $m^2$ to 12,500 kg per hour per $m^2$, preferably from 1,500 kg per hour per $m^2$ to 10,000 kg per hour per $m^2$, more preferably from 2,500 kg per hour per $m^2$ to 5,000 kg per hour per $m^2$. The ratio of steam fed to polymer solution or dispersion fed to the column may range from 0.1 to 0.6, preferably from 0.15 to 0.45, more preferably from 0.2 to 0.3. Maintaining the ratio of steam fed to polymer solution or dispersion fed to the column in this range helps to prevent foam generation.

In the second embodiment of the invention, gel formation may be controlled as discussed above in the first aspect of the invention, such as pH adjustment and temperature control.

In another embodiment of the invention, the polymer dispersion is chemically chased prior to stripping. Suitable chemical chasers include redox system combinations of oxidizing agents such as, but not limited to water-soluble hydroperoxides, tertiary butyl hydroperoxide, cumene hydroperoxide, hydrogen peroxide, sodium peroxide, potassium peroxide, sodium perborate, potassium persulfate, sodium persulfate, ammonium persulfate, persulfuric acid and salts thereof, perphosphoric acid and salts thereof, potassium permanganate, and an ammonium or alkali salt of peroxydisulfuric acid; reducing agents, such as, but not limited to ascorbic acid, isoascorbic acid, organic compounds containing thiol or disulfide groups, reducing inorganic alkali and ammonium salts of sulfur-containing acids, such as sodium sulfite, disulfite, thiosulfate, hydrosulfite, sulfide, hydrosulfide or dithionite, formadinesulfinic acid, hydroxymethanesulfonic acid, acetone bisulfite, amines, such as ethanolamine, glycolic acid, glyoxylic acid hydrate, lactic acid, glyceric acid, malic acid, tartaric acid, and oxidizing agents that are gaseous under normal conditions, such as oxygen, ozone, or air, or gaseous reducing agents, such as sulfur dioxide; and redox reaction catalyzing metal salts of iron, copper, manganese, silver, platinum, vanadium, nickel, chromium, palladium, or cobalt.

The amount of the redox system combination added to the polymer solution or dispersion typically ranges from 0.01 wt % to 0.5 wt %, preferably 0.05 wt % to 0.4 wt %, more preferably 0.2 wt % to 0.3 wt %, based on the total weight of the monomers used in the polymerization.

Surface active initiators containing at least one hydroperoxide, peroxo, or azo group (known as inisurfs) may also be utilized. The compounds were reviewed by B. A. Guyot and K. Tauer in *Adv. Polymer* Sci., Vol. 111, pp 54–64, and by K. Tauer in *Polymer News,* 1995, Vol. 20, pp. 342–347, hereby incorporated by reference for suitable inisurfs useful for chemical chasing.

Inisurfs may contain both hydrophilic and hydrophobic groups. Examples of hydrophilic groups include polyethylene oxide, carboxylate, or sulfonate groups. An example of a hydrophobic group is a paraffin group.

Inisurfs may be prepared by linking paraffin radicals having 10 to 18 carbon atoms with azo compounds, such as paraffin sulfochlorides or paraffin disulfonic acid chloride with azo compounds containing one or two iminoether or amidine groups. Alternative inisurfs may be prepared by reacting hydroperoxides or hydrogen peroxide with cyclic acid anhydrides of carboxylic acids or sulfonic acids containing 12 to 30 carbon atoms.

Other useful compounds include hydroperoxide or peroxo-group containing compounds which are the products of oxidation or autoxidation of autoxidizable, olefinically unsaturated fatty acids, fatty acid compounds, or fatty alcohols or hydrocarbons. The autoxidizable compounds include wood oil, tall oil, tung oil, safflower oil, lallementia oil, linseed oil, oiticica oil, perilla oil, poppyseed oil, sesame seed oil, walnut oil, hempseed oil, or castor oil.

Oleic acid, linolenic acid, linoleic acid, ricinoleic acid, elaidic acid, soybean oil fatty acid, frucic acid, erucic acid, arachidonic acid, palmitoleic acid, petroselic acid, oleyl alcohol, as well as drying fatty acids and fatty alcohols, which were prepared by conjugating or isomerizing the natural fatty acids, are also suitable autoxidizable fatty acids, fatty alcohols and hydrocarbons. The compounds may also be modified with polyethylene oxide.

The amount of inisurf added to the polymer solution or dispersion typically ranges from 0.05 wt % to 10 wt %, preferably 0.1 wt % to 2 wt %, based on the total weight of the monomers used in the polymerization.

Nucleophiles may also be useful as chemical chasers. Suitable nucleophiles include, but are not limited to, thiols, thio ureadioxide, sulfides, hydrogen sulfide, salts of sulfinic acid, sulfenic acid, disulfides such as sodium sulfide, sodium bisulfide, sodium thiosulfate, sodium sulfite, sodium bisulfite, sodium dioxide, phosphanes, alkylphosphanes, triphenyl phosphane, aminophosphanes, phosphorous acid and salts thereof, hypophosphorous acid and salts thereof, ammonia, primary and secondary amines, oximes, hydroxylamines, hydroxamic acids, hydrazine, and substituted hydrazines.

The molar ratio of nucleophile added to residual monomer typically ranges from 0.5 mole to 5 mole per mole monomer, preferably 0.9 mole to 3 mole, more preferably 0.9 mole to 2 mole nucleophile per mole residual monomer.

Organic carboxylic acids which contain no polymerizable olefinically unsaturated C—C double bonds and have a molecular weight of not more than 300 may also be useful as chemical chasers in aqueous polymer dispersions where a redox initiator system is concurrently utilized. In this embodiment of the invention, the redox initiator added is separate from the initiator system utilized to begin the polymerization. The redox initiator system typically comprises a peroxide or a peroxide generator at from 0.01 weight percent to 5 weight percent based on the total amount of monomers utilized for making the polymer dispersion, from 30 mole percent to 300 mole percent based on the peroxide or peroxide generator of an organic carboxylic acid described above, from 0 to 1000, preferably from 10 to 100 ppm based on the total amount of monomers utilized to prepare the polymer dispersion of a polyvalent metal ion capable of varying its valency, and from 0 to 10 weight percent based on the total amount of monomers utilized to prepare the polymer dispersion of a mineral acid.

The organic carboxylic acids may be aliphatic carboxylic acids with 1 to 20 and preferably 1 to 8 carbon atoms, having a water solubility of greater than 20 g per liter of water. Suitable organic carboxylic acids include, but are not limited to formic acid, benzoic acid, monochloroacetic acid, trifluoroacetic acid, naphthalenecarboxylic acid, oxalic acid, succinic acid, adipic acid, phthalic acid, terephthalic acid, derivatives thereof, and salts thereof.

The polyvalent metal ion may be selected from iron, copper, manganese, vanadium, nickel, cerium, chromium, platinum, and palladium. Iron and manganese are preferred.

The amount of the redox initiator system may range from 0.01 weight percent to 10 weight percent, preferably from 0.01 weight percent to 5 weight percent, based on the monomers used.

Throughout this specification and claims, unless otherwise indicated, references to percentages are by weight percent and all temperatures are in degree centigrade.

It is also to be understood that for purposes of this specification and claims that the range and ratio limits, recited herein, are combinable. For example, if ranges of 1–20 and 5–15 are recited for a particular parameter, it is understood that ranges of 1–15 or 5–20 are also contemplated.

The following examples are intended to illustrate the process of the invention. The examples should not be construed as limiting the scope of the invention.

EXAMPLE 1

Batch Steam Stripping

A batch steam stripping apparatus was set up including a 20 liter vessel equipped with a heated jacket, an agitator, an EKATO Foamjet, a vacuum source controlled by a needle valve, an electronic controller for the vacuum, an overhead condenser, and a steam sparger. The pressure was controlled near the water vapor-liquid equilibrium at a given temperature. To the vessel was added 11,000 g polymer dispersion which was chemically chased by one of the methods described above. The pH of the polymer was either unadjusted, or adjusted with sodium hydroxide or ammonium hydroxide. Steam was purged through the steam sparger at a rate of 10 g per minute. The EKATO Foamjet was rotated at a rate of 3,350 rotations per minute. The stripping process was run for approximately four hours. Two commercially available butyl acrylate/methyl methacrylate polymers were steam stripped at various temperatures in degrees C, pressures in mmHg, and pHs as indicated in Table 1.

The polymers had been chemically chased by the following process based on a total batch size of 13,500 g: Following the conversion of 90–99.99% of ethylenically unsaturated monomer to polymer, the polymer was cooled to 60° C. To the cooled polymer was added 80 ml of a charge promoter solution (0.15% $FeSO_4.H_2O$ in water). The polymer was stirred for approximately 15 minutes. A charge catalyst solution containing 8 g tertiary butyl hydroperoxide in 56 ml water was then added to the polymer. The polymer was stirred for approximately 15 minutes. A charge activator solution containing 8 g isoascorbic acid in 160 ml water was then added to the polymer. The polymer was stirred for approximately 15 minutes. After chemical chasing, the polymer dispersions were steam stripped.

Samples of each polymer dispersion were tested before and after steam stripping for gel content. The test was run by passing 750 ml of polymer dispersion through a 325 mesh screen. Any gel on the screen was dried and the dry weight of gel per 750 ml of dispersion was calculated. Where the screen was overloaded with gel such that the entire sample could not be passed through the screen (binded), the sample was rated a failure and the gel was not measured. The results of the gel tests are reported in Table 1.

TABLE 1

| Polymer | pH Before | pH After | Temperature | Gel Before | Gel After |
|---------|-----------|----------|-------------|------------|-----------|
| A | 9.5 | 10. | 53 | 0.02 | 0.01 |
| A | 9.8 | 8.6 | 54 | 0.02 | 0.05 |
| A | 9.0 | 7.4 | 54 | Not Run | Not Run* |
| B | 4.7 | 4.7 | 58 | 0.02 | Binded |
| B | 4.5 | 4.5 | 50 | 0.02 | 0.16 |
| B | 4.4 | 4.2 | 47 | 0.03 | 0.06 |
| B | 9.1 | 8.5 | 49 | 0.02 | 0.02 |
| B | 9.1 | 8.7 | 55 | 0.02 | 0.08 |

*gels were not run on this sample - due to a large amount of gels remaining in the vessels after the run.

EXAMPLE 2

Comparison of Direction of Polymer Movement

These experiments were designed to show the effects of the direction of agitation during stripping on the rate of VOC removal from the polymer. The set up was the same as Example 1 except in Experiment 1, the agitator was 3 pitched blade turbines having a diameter equal to 28% of the reactor diameter. In this experiment, the agitator was pumping polymer down the reactor. In experiment 2, the agitator was 2 pitched blade turbines having a diameter equal to 48% of the reactor diameter. In this experiment, the agitator was pumping polymer up the reactor. Approximately 10,000 g of polymer emulsion were added to the stripping vessel. The polymer emulsion was heated to 50° C. Steam was introduced into the system at an average rate of 19.7 g/min. Experiment 3 was a repeat of Experiment 2, except the steam rate was decreased to 8.6 g/min. Samples were removed at 30 minute intervals and analyzed by gas chromatography for residual VOCs. The results of these experiments are shown in Table 2.

TABLE 2

| | Initial | % VOC Retained Over Time (minutes) | | | | | |
|---|---|---|---|---|---|---|---|
| Example | VOC (ppm) | 30 | 60 | 90 | 120 | 180 | 240 |
| 1 (Comp) | 1205 | NA | 77 | NA | 60 | 41 | 33 |
| 2 | 1165 | 58 | 29 | 16 | 9 | 5 | 2 |
| 3 | 1351 | 61 | 48 | 39 | 31 | 23 | 17 |

Comp = comparative

The experiments above show that VOCs are removed from the polymers much faster when the direction of agitation is changed to pump the polymer up in the reactor, as opposed to the agitator pumping the polymer down the reactor.

EXAMPLE 3

Continuous Steam Stripping

Several commercially available emulsion polymers were continuously stripped using two different sets of stripping equipment. The first set of equipment was a Buffalo Technologies Corporation falling film stripper. The column had an internal diameter of 5.1 cm and a length of 3.7 m. The emulsion polymers were fed down the column while steam was fed up the column. Stripping was performed both under vacuum and at atmospheric pressure (Wet Air Stripping). The polymers were measured for VOCs by Gas Chromatography both before and after stripping. VOCs with boiling points below 100° C. were combined and reported together, as were VOCs with boiling points above 100° C. The samples were also passed through a 325 mesh screen to test for gel formation. The results of these experiments are shown in Table 3.

TABLE 3

| | Polymer | Steam | Column Temp. (° C.) | | VOCs | | |
|---|---|---|---|---|---|---|---|
| Example | (kg/hr) | (kg/hr) | Top | Bottom | <100° C. | >100° C. | Gel |
| 1 | A/16 | 6 | 52 | 51 | 160 | 320 | No |
| 2 | A/9 | 7 | 52 | 50 | 65 | 215 | No |
| 3 | A/29 | 5 | 52 | 51 | 130 | 258 | No |
| 4 | A/9 | 5 | 52 | 51 | 257 | 246 | No |
| 5 | A/41 | 5 | 50 | 50 | 205 | 281 | 120 |
| 6 | A/37 | 5 | 50 | 49 | 294 | 296 | No |
| 7 | A/46 | 6 | 51 | 49 | 120 | 259 | 103 |
| 8 | A/30 | 6 | 51 | 49 | 207 | 284 | No |
| 9 | A/37 | 6 | 49 | 49 | 97 | 236 | No |
| 10 | B/11 | 5 | 49 | 48 | 69 | 260 | B |
| 11 | B/19 | 9 | 49 | 48 | 58 | 308 | B |
| 12 (WA) | B/51 | 19 | 33 | 31 | 580* | 919* | B |

WA = wet air stripping
*experimental error suspected
Gel reported in parts per million
B = binded The initial VOC levels for polymer A were 1342 ppm with a boiling point <100 ° C. and 432 ppm with a boiling point >100° C. The initial VOC levels for polymer B were 477 ppm with a boiling point <100° C., and 605 ppm with a boiling point >100° C. The examples above show that the continuous process utilizing the Buffalo Technologies Corporation falling film column removed VOCs from the polymer dispersion and did not form gel.

The second set of equipment was an Artisan Industries Corporation tube/disk falling film stripper. The column had an internal diameter of 10.2 cm and a length of 3.7 m. The emulsion polymers were fed down the column while steam was fed up the column. Stripping was performed both under vacuum and Wet Air Stripping. The polymers were analyzed as described above. The results of these experiments are shown in Table 4.

TABLE 4

| Example | Polymer (kg/hr) | Steam (kg/hr) | Column Temp. (° C.) | | VOCs | | Gel |
|---|---|---|---|---|---|---|---|
| | | | Top | Bottom | <100° C. | >100° C. | |
| 13 | A/18 | 1 | 49 | 52 | 345 | 300 | No |
| 14 | A/18 | 1 | 48 | 49 | 531 | 366 | No |
| 15 | A/18 | 1 | 46 | 48 | 420 | 355 | No |
| 16 | A/18 | 2 | 51 | 52 | 90 | 251 | No |
| 17 | A/18 | 2 | 49 | 50 | 86 | 231 | No |
| 18 | A/18 | 2 | 47 | 48 | 90 | 269 | No |
| 19 | A/18 | 2.5 | 51 | 53 | 48 | 204 | No |
| 20 | A/18 | 2.4 | 49 | 51 | 25 | 158 | No |
| 21 | A/18 | 2.6 | 48 | 49 | 29 | 173 | No |
| 22 | B/18 | 1.4 | 59 | 59 | 83 | 358 | No |
| 23 | B/18 | 2.6 | 59 | 59 | 64 | 310 | No |
| 24 | B/18 | 4.3 | 59 | 60 | 41 | 277 | No |
| 25 (WA) | B/18 | 6.5 | 49 | 44 | 274 | 553 | No |

WA = wet air stripping

The initial VOC levels for polymer A were 1541 ppm with a boiling point <100° C., and 484 ppm with a boiling point >100° C. The initial VOC levels for polymer B were 470 ppm with a boiling point <100° C., and 588 ppm with a boiling point >100° C. The examples above show that the continuous process utilizing the Artisan Industries Corporation tube/disk falling film stripper removed VOCs from the polymer dispersion and did not form gel.

We claim:

1. A process comprising:
   providing a reaction composition comprising an aqueous emulsion polymer and stripping the reaction composition in the presence of a mechanical foam breaker and an agitator; wherein the reaction composition is treated by:
   (a) adjusting the pH to from 7 to 11 prior to stripping and maintaining the adjusted pH during stripping and
   (b) maintaining the temperature of the reaction composition at from 30° C. to 70° C. during stripping;
   wherein the formation of gel is minimized.

2. The process according to claim 1 wherein, the pH of the reaction composition is adjusted to from 8 to 11 prior to stripping and maintained during stripping.

3. The process according to claim 1 wherein, the pH of the reaction composition is adjusted to from 8.5 to 11 prior to stripping and maintained during stripping.

4. The process according to claim 1 wherein, the temperature of the reaction composition is maintained at from 40° C. to 70° C. during stripping.

5. The process according to claim 1 wherein, the temperature of the reaction composition is maintained at from 45° C. to 59° C. during stripping.

6. The process according to claim 1 wherein, the pH of the reaction composition is adjusted to from 9 to 11 prior to stripping and maintained during stripping and the temperature of the reaction composition is maintained at from 45° C. to 59° C. during stripping.

7. The process according to claim 1 wherein, the agitator pumps the reaction composition up in the reactor.

8. The process according to claim 1 wherein, the reaction composition is chased with a chemical chaser selected from the group consisting of redox system combinations, inisurfs, and nucleophiles prior to stripping.

9. A process comprising:
   i) continuously feeding a reaction composition comprising an acrylic dispersion polymer containing volatile organic compounds down a stripping column having a top and a bottom;
   ii) continuously feeding steam up from the bottom of the stripping column; and
   iii) removing the volatile organic compounds from the reaction composition;
   wherein the pH of the reaction composition is adjusted to from 7 to 11 prior to stripping and maintaining the adjusted pH during stripping.

10. The process according to claim 9 wherein, the column flux rate of the reaction composition into the column ranges from 2,500 kg per hour per $m^2$ to 30,000 kg per hour per $m^2$ and the column flux rate of steam into the column ranges from 500 kg per hour per $m^2$ to 12,500 kg per hour per $m^2$.

11. The process according to claim 9 wherein, the stripping is performed at a temperature from 30° C. to 70° C. and a pressure from 20 mmHg to 150 mmHg.

12. The process according to claim 9 wherein, the pH of the reaction composition is adjusted to from 8 to 11 prior to stripping and maintained during stripping.

13. The process according to claim 9 wherein, the temperature of the reaction composition is maintained at from 40° C. to 70° C. during stripping.

14. The process according to claim 9 wherein, the pH of the reaction composition is adjusted to from 8.5 to 11 prior to stripping and maintained during stripping and the temperature of the reaction composition is maintained at from 45° C. to 59° C. during stripping.

15. The process according to claim 9 wherein, the reaction composition is chased with a chemical chaser selected from the group consisting of redox system combinations, inisurfs, and nucleophiles prior to stripping.

16. A process comprising providing a reaction composition comprising an aqueous emulsion polymer and stripping the reaction composition in the presence of a mechanical foam breaker and an agitator; wherein the reaction composition is treated by adjusting the pH to from 7 to 11 prior to stripping and maintaining the adjusted pH during stripping, wherein the formation of gel is minimized.

* * * * *